US 7,149,302 B2

(12) United States Patent
Tsukazoe et al.

(10) Patent No.: US 7,149,302 B2
(45) Date of Patent: Dec. 12, 2006

(54) WEB-BASED CTI SYSTEM

(75) Inventors: Atsushi Tsukazoe, Fukuoka (JP);
Kousuke Sakamoto, Fukuoka (JP);
Koichi Yoshida, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 309 days.

(21) Appl. No.: 10/268,183

(22) Filed: Oct. 10, 2002

(65) Prior Publication Data

US 2003/0185377 A1 Oct. 2, 2003

(30) Foreign Application Priority Data

Mar. 29, 2002 (JP) ............................. 2002-096727

(51) Int. Cl.
*H04M 5/00* (2006.01)
(52) U.S. Cl. .................... 379/242; 379/265.01
(58) Field of Classification Search ..............
379/265.01–265.14, 266.01–266.1, 309, 379/242
See application file for complete search history.

(56) References Cited

U.S. PATENT DOCUMENTS

| 6,259,774 | B1 | 7/2001 | Miloslavsky |
| 6,614,783 | B1 * | 9/2003 | Sonesh et al. ............. 370/352 |
| 2004/0028213 | A1 * | 2/2004 | Gross et al. |
| 2004/0039846 | A1 * | 2/2004 | Gross et al. |
| 2004/0169675 | A1 * | 9/2004 | Beck et al. |
| 2004/0249650 | A1 * | 12/2004 | Freedman et al. |

FOREIGN PATENT DOCUMENTS

| JP | 11-508430 | 7/1999 |
| JP | 11-239214 | 8/1999 |
| JP | 11-289389 | 10/1999 |
| JP | 11-346266 | 12/1999 |
| JP | 2002-176500 | 6/2002 |

* cited by examiner

*Primary Examiner*—William J. Deane, Jr.
(74) *Attorney, Agent, or Firm*—Katten Muchin Rosenman LLP

(57) ABSTRACT

A Web-based CTI system has a first control module displaying, on a screen of a customer terminal, a phone number for specifying an in-charge person terminal utilized by an optimal in-charger person determined based on a browse history and input information given so far in response to an inquiry request occurred in the midst of browsing a page through on the screen of the customer terminal utilized by a customer, and a second control module displaying, when there occurs a receipt of a voice communication connected to a phone number for specifying the in-charge person terminal that is displayed on the screen of the customer terminal, on the screen of the in-charge person terminal a piece of information as an inquiry content containing an interest of the customer utilizing the customer terminal that has been generated based on the browse history and the input information, the screen display being triggered by the receipt of the voice communication.

15 Claims, 18 Drawing Sheets

FIG. 5

115 HISTORY INFORMATION MANAGEMENT DATABASE

URL MANAGEMENT TABLE / IP MANAGEMENT TABLE

| URL | KEY INFORMATION | | | ACCESS MANAGEMENT TABLE | | | |
|---|---|---|---|---|---|---|---|
| | BASIC KEY | PRIMARY KEY | SECONDARY KEY | IP ADDRESS (TERMINAL PC) | ACCESS COUNT | IP ADDRESS (USER TERMINAL PC) | ACCESS COUNT |
| http://172.27.111.010/PCdisk_ka | 1.PC-RELATED | 1.DESK TOP | 1.PRICE | 192.168.111.100 | 1 | 192.169.121.102 | 2 |
| http://172.27.111.010/PCdisk_si | 1.PC-RELATED | 1.DESK TOP | 2.SPECIFICATION | 192.168.111.100 | 1 | 192.169.121.102 | 6 |
| http://172.27.111.010/PCdisk_fl | 1.PC-RELATED | 1.DESK TOP | 3.TROUBLE | | ? | | |
| http://172.27.111.010/PCnote_ka | 1.PC-RELATED | 2.NOTEBOOK | 1.PRICE | 192.168.111.100 | 10 | 192.169.121.102 | 1 |
| http://172.27.111.010/PCnote_si | 1.PC-RELATED | 2.NOTEBOOK | 2.SPECIFICATION | 192.168.111.100 | 8 | | ? |
| http://172.27.111.010/PCnote_fl | 1.PC-RELATED | 2.NOTEBOOK | 3.TROUBLE | | ? | | ? |
| http://172.27.111.010/PCdisp_ka | 1.PC-RELATED | 3.DISPLAY | 1.PRICE | | ? | | ? |
| http://172.27.111.010/PCdisp_si | 1.PC-RELATED | 3.DISPLAY | 2.SPECIFICATION | | ? | | ? |
| http://172.27.111.010/PCdisp_fl | 1.PC-RELATED | 3.DISPLAY | 3.TROUBLE | | ? | | ? |
| http://172.27.111.010/PCsyuu_ka | 1.PC-RELATED | 4.PERIPHERAL DEVICE | 1.PRICE | 192.167.101.101 | 5 | | ? |
| http://172.27.111.010/PCsyuu_si | 1.PC-RELATED | 4.PERIPHERAL DEVICE | 2.SPECIFICATION | 192.167.101.101 | 1 | | ? |
| http://172.27.111.010/PCsyuu_fl | 1.PC-RELATED | 4.PERIPHERAL DEVICE | 3.TROUBLE | | ? | | ? |
| http://172.27.111.010/PRlase_ka | 2.PRINTER-RELATED | 1.LASER PRINTER | 1.PRICE | 192.170.130.103 | 1 | | ? |
| http://172.27.111.010/PRlase_si | 2.PRINTER-RELATED | 1.LASER PRINTER | 2.SPECIFICATION | 192.170.130.103 | 5 | | ? |
| ? | ? | ? | ? | ? | ? | ? | ? |

FINAL HOMEPAGE ADDRESS MANAGEMENT TABLE

USER (BROWSING USER) IP ADDRESS:192.168.111.100
FINAL BROWSING URL:http://172.27.111.010/PCnote_fl/nnc
USER (BROWSING USER) IP ADDRESS:192.169.121.102
FINAL BROWSING URL:http://172.27.111.010/PCnote_fl/fujitsu

FIG. 6

116 INPUT INFORMATION MANAGEMENT DATABASE

| IP ADDRESS (USER TERMINAL (PC)) | INPUT INFORMATION 1 | INPUT INFORMATION 2 | ...... | INPUT INFORMATION n |
|---|---|---|---|---|
| 192.168.111.100 | PC MADE BY F CORP | LAN-INSTALLED PC | ...... | |
| 192.167.101.101 | DESIRE FOR GETTING ROUTER | DESIRE FOR GETTING HUB | ...... | SWITCHING HUB |
| 192.169.121.102 | PROCESSING CAPACITY | CPU | ...... | |

117 BASIC CATEGORY KEY DATABASE (1. PC-RELATED) (2. PRINTER-RELATED, ETC)

| IN-CHARGE PERSON GROUP | 1. DESK TOP | | | 2. NOTEBOOK | | | ... |
|---|---|---|---|---|---|---|---|
| | 1. PRICE | 2. SPECIFICATION | 3. TROUBLE | 1. PRICE | 2. SPECIFICATION | 3. TROUBLE | |
| 1 | ○ | | | | | | ⋯ |
| 2 | ○ | ○ | | | | | ⋯ |
| 3 | ○ | | ○ | | | | ⋯ |
| 4 | | | | ○ | ○ | | ⋯ |
| 5 | | | | ○ | ○ | ○ | ⋯ |
| 6 | | | | | | ○ | ⋯ |
| ⋮ | ⋮ | ⋮ | ⋮ | ⋮ | ⋮ | ⋮ | ⋮ |

INDEXED TO FIG. 8

FIG. 8

INDEXED FROM FIG. 7
118 PHONE NUMBER/DISPLAY CONTENT MANAGEMENT DATABASE

| IN-CHARGE PERSON GROUP | INQUIREE PHONE NUMBER | DISPLAY CONTENT |
|---|---|---|
| 4 | 0120-885-111 | FINAL HOMEPAGE ADDRESS http://172.27.111.010/PCnote_ka/fujitsu<br>USER HAS INTEREST IN PRICES AND SPECIFICATIONS OF NOTEBOOK SIZE PCs, SEARCH KEY IS [HD60G] [DVD-RAM BUILT-IN TYPE] |
|  | 0120-885-112 | FINAL HOMEPAGE ADDRESS http://172.27.111.010/PCnote_ka/nnc<br>USER HAS INTEREST IN PRICES AND SPECIFICATIONS OF NOTEBOOK SIZE PCs, SEARCH KEY IS [PC MADE BY F CORP.]<br>[LAN-INSTALLED PC] |
|  | 0120-885-113 |  |
|  | 0120-885-114 |  |
|  | 0120-885-115 |  |
|  | 0120-885-116 |  |
|  | ⋮ |  |

FIG. 9

119 IN-CHARGE PERSON MANAGEMENT DATABASE

| IN-CHARGE PERSON GROUP | IN-CHARGE PERSON TERMINAL (PC) IP ADDRESS | PBX-MANAGED PHONE NUMBER |
|---|---|---|
| ... | ... | ... |
| 4 | 180.111.222.222 | 4709 |
|   | 180.111.222.100 | 4201 |
|   | 180.111.222.133 | 4303 |
|   | 180.111.222.177 | 4763 |
|   | 180.111.222.123 | 4379 |
|   | 180.111.222.155 | 4356 |
| 5 | 180.111.222.100 | 4201 |
|   | 180.111.222.223 | 4333 |
|   | 180.111.222.144 | 4320 |
|   | 180.111.222.166 | 4203 |
|   | 180.111.222.188 | 4388 |
|   | 180.111.222.199 | 4567 |
| ... | ... | ... |

IN-CHARGE PERSON MAY BE DUALLY REGISTERED

FIG. 15

3 IN-CHARGE PERSON TERMINAL (PC)

FINAL DISPLAY SCREEN HYPERLINKED FROM HOMEPAGE
ADDRESS http://172.27.111.010/PCnote_ka/nnc USER HAS INTEREST IN PRICES AND SPECIFICATIONS
OF NOTEBOOK SIZE PCs.
SEARCH KEY IS
[PC MADE BY F CORP.] [LAN-INSTALLED PC].

FIG. 16

CALLEE CHANGE REQUEST

| TYPE | IN-CHARGE PERSON GROUP | INQUIREE PHONE NUMBER | PBX-MANAGED PHONE NUMBER | | IN-CHARGE PERSON IP ADDRESS | |
|---|---|---|---|---|---|---|
| CHG | 4 | 0120885222 ~ 0120885999 | 5001 | ~ 5999 | 180111222150 | ~ 180111222168 |

☆PBX-MANAGED PHONE NUMBER AND IN-CHARGE PERSON IP ADDRESS ARE PAIRED

CALL RECEIVING REQUEST

| TYPE | INQUIREE PHONE NUMBER | CALLEE PHONE NUMBER |
|---|---|---|
| RNG | 0120885112 | 4201 |

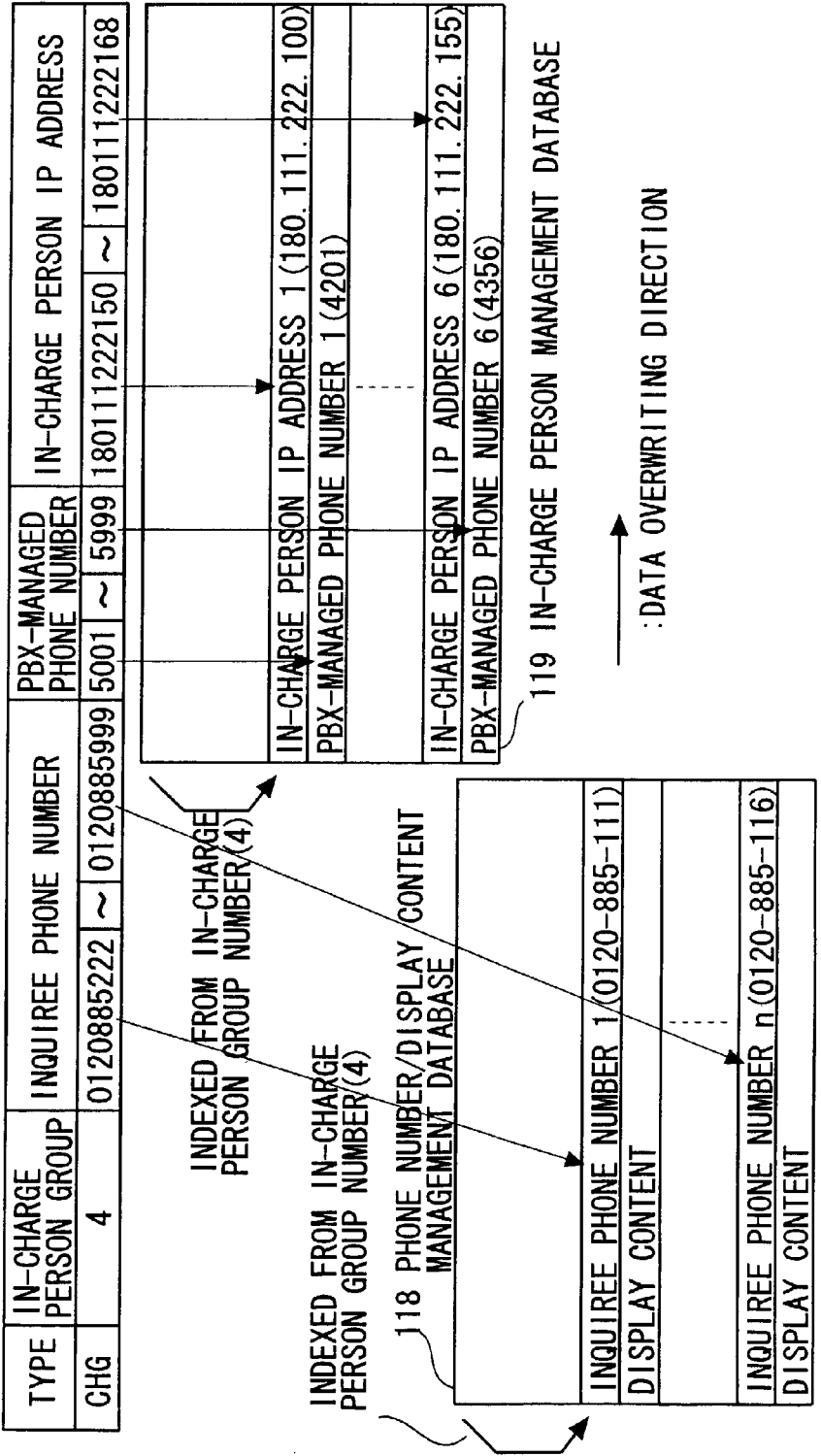

WEB-BASED CTI SYSTEM

BACKGROUND OF THE INVENTION

The present invention relates generally to a CTI (Computer Telephony Integration) system, and more particularly to a Web-based CTI system suited to configuring a call center and a help desk for performing customer window services such as selling commercial articles consulting with customers by utilizing WWW (World Wide Web).

The CTI system is capable of configuring the call center and the help desk for performing the customer window services such as selling the commercial articles and consulting with the customers by a technology of integrating a computer (data service) with a telephone (voice service).

In the Web-based CTI system that configures the call center etc in linkage with a Web server, the customer (who might be herein called a user), if there arises a necessity of speaking to an in-charge person at the call center who has special knowledge about a browsing content when browsing a Web page, has hitherto dialed (originated a call) an inquiree phone number displayed on a screen of a customer terminal through the Web browser and had a dialog with the in-charge person.

According to this customer-oriented method, however, the in-charge person is not recognizable of what content the inquiry made by the customer has unless the in-charge person speaks directly to the customer, and hence it is difficult to perform the customer window services quickly and exactly.

Further, in a Web-based CTI system disclosed in Japanese Patent Laying-open Publication No.11-346266, as shown in FIG. 1, when issuing an inquiry request (interaction request) by clicking an interaction request button embedded in a Web page from on a personal computer PC serving as a user terminal utilized by the user, the Web server displays a form for prompting the user to input a phone number of a user telephone terminal TEL on the screen of the user personal computer terminal PC.

When the user inputs the phone number of the user telephone terminal TEL from the user personal computer terminal PC (processing step 1), the Web server indicates, based on a user browsing history of the Web pages, a PBX (Private Branch Exchange) to call an in-charge person telephone terminal TEL used by the in-charge person having the knowledge that meets a demand of the user and to make a request for establishing a connection for a voice communication with the inputted phone number of the user via LAN (Local Area Network) and a CTI server (processing steps 2, 3).

The web server, upon a completion of the connection between the user telephone terminal TEL and the in-charge person telephone terminal TEL, displays the content of the Web page accessed by the user on the in-charge person personal computer terminal PC (processing steps 4, 5)

This scheme enables the in-charge person to deal with the user's inquiry content while confirming it in this Web-based CTI system.

According to this Web-based CTI system, however, the user invariably needs to engage in both of the voice communications and data communications at the same time through the user telephone terminal TEL and the user personal computer terminal PC in order to interact with the terminals of the in-charge person. In addition, when making the inquiry request (interaction request), it is indispensable to connect the user personal computer terminal PC to the Internet network.

Further, there is a case where a call to the user telephone terminal TEL is delayed due to busy lines of the PBX and of the in-charge person telephone terminal TEL. In this case, the call from the PBX might arrive at the user telephone terminal TEL irrespective of convenience on the user side.

Moreover, when the user makes a re-inquiry, a problem is that the Web server might misrecognize the inquiry content unless the user personal computer terminal PC is temporarily connected to the Internet network and the same access history as before is left.

SUMMARY OF THE INVENTION

It is a primary object of the present invention to provide a technology more suited to configuring a call center and a help desk for performing customer window services such as selling commercial articles and consulting with customers by utilizing Web.

It is another object of the present invention to provide a technology capable of notifying, when the customer makes an inquiry from a customer terminal, the customer of a phone number of an in-charge person terminal utilized by an in-charge person who is able to provide information needed by the customer.

It is still another object of the present invention to provide a technology by which the customer, even when making the re-inquiry from the customer terminal, may simply dial the same phone number without reconnecting to the Internet network.

It is a further object of the present invention to provide a technology capable of sealing with a customer's inquiry content quickly and exactly in a way that makes this inquiry content recognizable by an in-charge person at a call center just when an in-charge terminal receives a voice communication.

It is a still further object of the present invention to provide a technology capable of transferring a call to an optimal in-charge person even if an inquiree phone number changes due to an external factor.

To accomplish the above objects, a first Web-based CTI system according to the present invention includes a first control module displaying, on a screen of a customer terminal, a phone number for specifying an in-charge person terminal utilized by an optimal in-charger person determined based on a browse history and input information given so far in response to an inquiry request occurred in the midst of browsing a page through on the screen of the customer terminal utilized by a customer, and a second control module displaying, when there occurs a receipt of a voice communication connected to a phone number for specifying the in-charge person terminal that is displayed on the screen of the customer terminal, on the screen of the in-charge person terminal a piece of information as an inquiry content containing an interest of the customer utilizing the customer terminal that has been generated based on the browse history and the input information, the screen display being triggered by the receipt of the voice communication.

A second Web-based CTI system according to the present invention may further include a module detecting the receipt of the voice communication connected to the phone number for specifying the in-charge person terminal that is displayed on the screen of the customer terminal, and a module notifying of the phone number for specifying the in-charge terminal when detecting the receipt of the voice communication.

A third Web-based CTI system according to the present invention may further include a module determining, based on address information obtained corresponding to the notified phone number for specifying the in-charge person terminal, a display target in-charge person terminal on which the information containing the interest of the customer is displayed as the inquiry content.

A fourth Web-based CTI system according to the present invention may further include a module extracting, based on the phone number for specifying the in-charge person terminal, the information as the inquiry content containing the interest of the customer that is stored for being displayed on the in-charge person terminal.

A fifth Web-based CTI system according to the present invention may further include a module receiving a change request of the in-charge person terminal and rewriting, based on a new phone number and a new piece of address information contained in the change request, corresponding pieces of stored data.

In a sixth Web-based CTI system according to the present invention, the first control module may dynamically change the display of the phone number for specifying the in-charge person terminal on the screen of the customer terminal.

In a seventh Web-based CTI system according to the present invention, the inquiry request may occur upon specifying an inquiry button displayed on the screen of the customer terminal in the midst of browsing the page.

A first information providing control device in the Web-based CTI system includes a first control module displaying, on a screen of a customer terminal, a phone number for specifying an in-charge person terminal utilized by an optimal in-charger person determined based on a browse history and input information given so far in response to an inquiry request occurred in the midst of browsing a page through on the screen of the customer terminal utilized by a customer, and a second control module displaying, when there occurs a receipt of a voice communication connected to a phone number for specifying the in-charge person terminal that is displayed on the screen of the customer terminal, on the screen of the in-charge person terminal a piece of information as an inquiry content containing an interest of the customer utilizing the customer terminal that has been generated based on the browse history and the input information, the screen display being triggered by the receipt of the voice communication.

A second information providing control device in the Web-based CTI system according to the present invention may further include a module determining a display target in-charge person terminal on which the information containing the interest of the customer is displayed as the inquiry content on the basis of address information obtained corresponding to the phone number, of which an exchange device detecting a receipt of the voice communication notifies, for specifying the in-charge person terminal.

A third information providing control device in the Web-based CTI system according to the present invention may further include a module extracting, based on the phone number for specifying the in-charge person terminal, the information as the inquiry content containing the interest of the customer that is stored for being displayed on the in-charge person terminal.

A fourth information providing control device in the Web-based CTI system according to the present invention may further include a module receiving a change request of the in-charge person terminal and rewriting, based on a new phone number and a new piece of address information contained in the change request, corresponding pieces of stored data.

In a fifth information providing control device in the Web-based CTI system according to the present invention, the first control module may dynamically change the display of the phone number for specifying the in-charge person terminal on the screen of the customer terminal.

An information providing control method in a Web-based CTI system includes displaying, on a screen of a customer terminal, a phone number for specifying an in-charge person terminal utilized by an optimal in-charger person determined based on a browse history and input information given so far in response to an inquiry request occurred in the midst of browsing a page through on the screen of the customer terminal utilized by a customer, and displaying, when there occurs a receipt of a voice communication connected to a phone number for specifying the in-charge person terminal that is displayed on the screen of the customer terminal, on the screen of the in-charge person terminal a piece of information as an inquiry content containing an interest of the customer utilizing the customer terminal that has been generated based on the browse history and the input information, the screen display being triggered by the receipt of the voice communication.

There is provided a readable-by-computer recording medium recorded with a program, executed by a computer, including displaying, on a screen of a customer terminal, a phone number for specifying an in-charge person terminal utilized by an optimal in-charger person determined based on a browse history and input information given so far in response to an inquiry request occurred in the midst of browsing a page through on the screen of the customer terminal utilized by a customer, and displaying, when there occurs a receipt of a voice communication connected to a phone number for specifying the in-charge person terminal that is displayed on the screen of the customer terminal, on the screen of the in-charge person terminal a piece of information as an inquiry content containing an interest of the customer utilizing the customer terminal that has been generated based on the browse history and the input information, the screen display being triggered by the receipt of the voice communication.

BRIEF DESCRIPTION OF THE DRAWINGS

The foregoing and other features and advantages of the present invention will become more readily appreciated as the same becomes better understood by reference to the following detailed description when taken into conjunction with the accompanying drawings wherein:

FIG. 5 is a chart showing an example of a detailed structure of a history information management data storage module (database) in FIG. 2;

FIG. 6 is a chart showing an example of a detailed structure of an input information management data storage module (database) in FIG. 2;

FIG. 8 is a chart showing an example of a detailed structure of a phone number/display content management data storage module (database) in FIG. 2;

FIG. 9 is a chart showing an example of a detailed structure of an in-charge person management data storage module (database) in FIG. 2;

FIG. 15 is a diagram showing an example of display on an in-charge person personal computer terminal when receiving a voice communication connected to an in-charge person telephone terminal;

FIG. 16 is a diagram showing an example of an interface message format;

FIG. 18 is an explanatory diagram showing an example of a data change based on a callee change request message.

DETAILED DESCRIPTION OF THE PREFERRED EMBODIMENTS

Next, an embodiment of the present invention will hereinafter be described with reference to the accompanying drawings.

[Architecture of Web-based CTI System]

Figure 1:
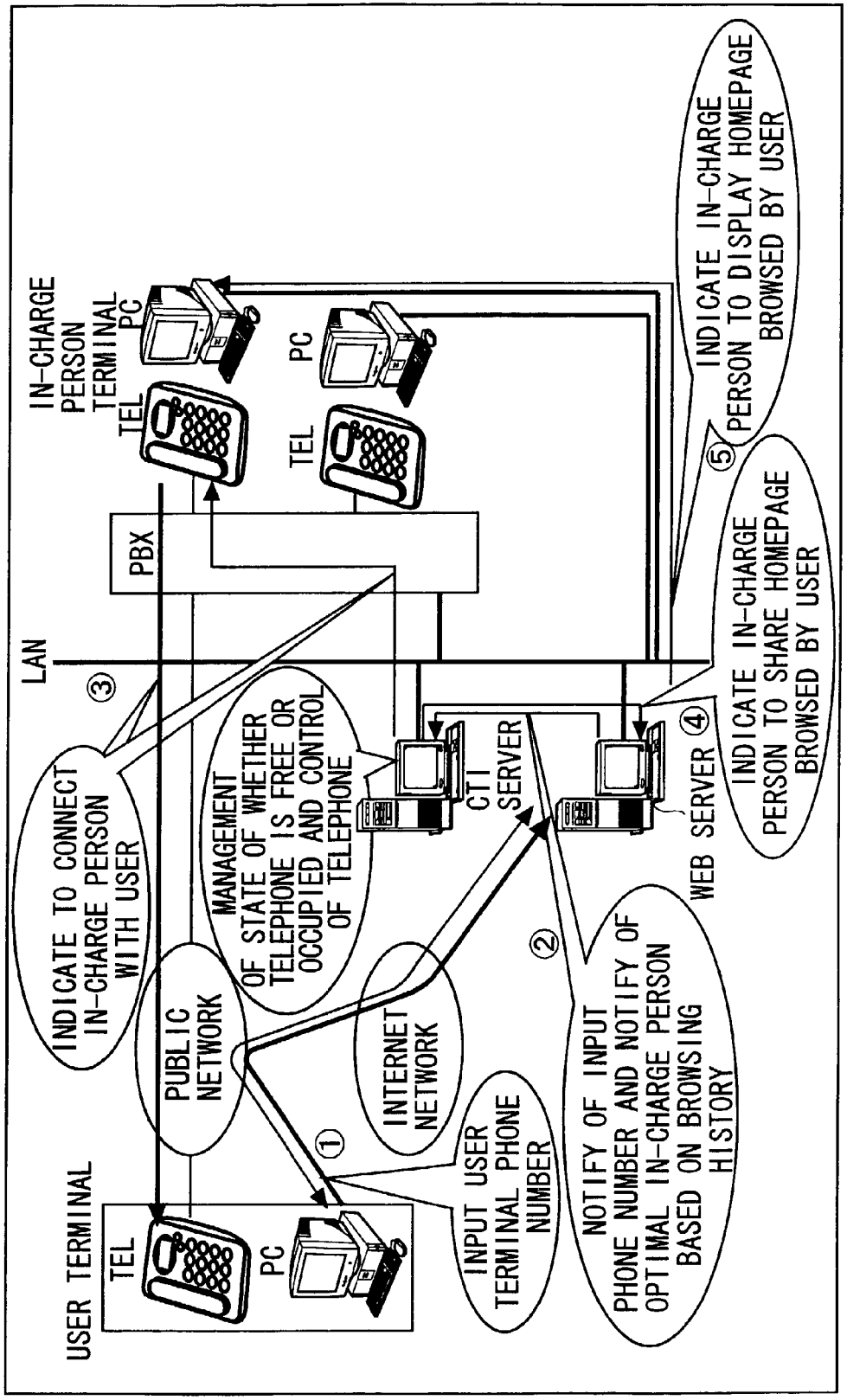
FIG. 1 is an explanatory view showing a configuration and operations of a conventional Web-based CTI system.
Figure 2:
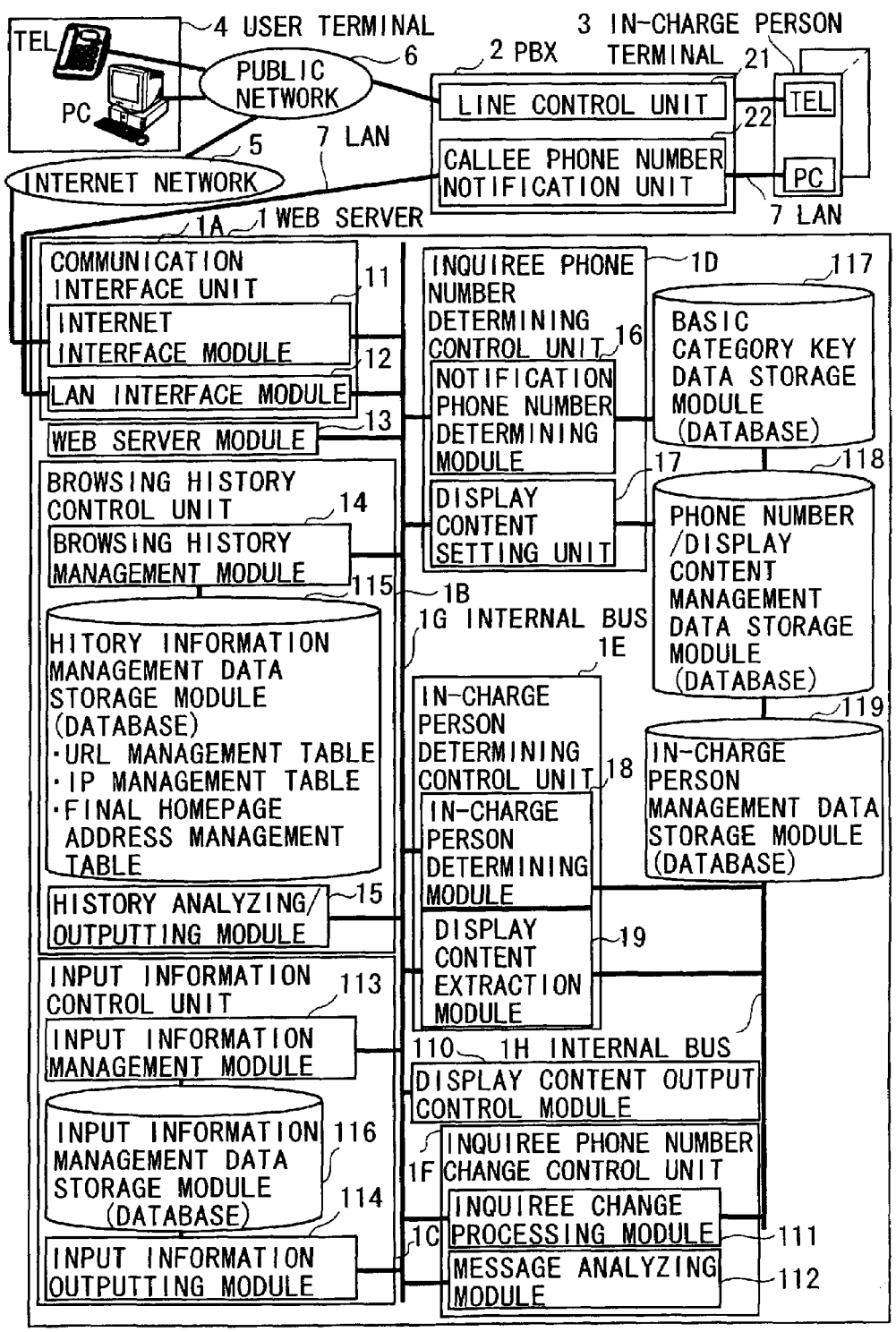
FIG. 2 is a block diagram showing an architecture of a Web-based CTI system in one embodiment of the present invention.

FIG. 2 shows a system architecture in one embodiment of the present invention. Referring to FIG. 2, a Web-based CTI system SYS, which is suited to configuring a call center and a help desk that sell commercial articles and perform customer window services such as consulting wit customers in a way that utilizes Web, includes a Web server 1 serving as an information providing control device, a private branch exchange (PBX) 2, a plurality of in-charge person terminals 3, customer (user) terminals 4, an Internet network 5, a public telephone network 6 and a LAN 7.

Herein, the call center is configured by the Web server 1, the PBX 2, the plurality of in-charge person terminals 3 and the LAN 7. The plurality of in-charge person terminals 3 organize at least one group. Each in-charge person terminal 3 used by each in-charge person at the call center is an integrated unit constructed of a telephone (a voice communication terminal) TEL and a personal computer (information terminal) PC. The personal computer PC as the information terminal may be a computer terminal such as a workstation and so on.

The PBX 2 includes a line control unit 21 connected to the public telephone network 6, and a callee phone number notifying unit 22 connected to the Web server 1 and to the personal computer PC of the individual in-charge person terminal 3 which will hereinafter be referred to as the in-charge person terminal (PC) 3 in some cases) via the LAN 7. The PBX 2 accommodates the telephone TEL of each in-charge person terminal 3 (which will hereinafter be termed the in-charge terminal (TEL) 3 as the case may be).

Herein, the illustration of the PBX 2 shows just components required for embodying the present invention.

The line control unit 21 of the PBX 2 determines the in-charge person terminal (TEL) 3 from a callee phone number (an inquiree phone number) received (sent by the user terminal) via the public telephone network 6, and executes call setting control. Further, the callee phone number notifying unit 22 notifies the Web server 1 of the callee phone number received and a phone number (a PBX-managed callee phone number) of the in-charger person terminal (TEL) 3 used by the called (determined) in-charge person via the LAN 7.

The user terminal 4 utilized by the user is constructed of a home-installed telephone (voice communication terminal) TEL of each user, and a personal computer (information terminal) PC. The telephone TEL of the user terminal 4 will hereinafter be referred to as a user terminal (TEL) 4, while the personal computer PC of the user terminal 4 will be termed a user terminal (PC) as the came may be.

Note that the user terminal 4 may, if incorporating a communication function, an information input function, an information display function and an information specifying function, take any form of a single unit or a composite unit of a fixed telephone terminal, a mobile telephone terminal, a personal computer, a PDA (Personal Digital Assistant) and so forth.

The user terminal (TEL) 4 is connected to the public telephone network 6, and the user terminal (PC) 4 is connected to the Internet network 5 via the public telephone network 6. The connection between the user terminal (TEL) 4, the user terminal (PC) and the public telephone network 6 involves the use of an analog telephone line, an ISDN (Integrated Services Digital Network) line, an ADSL (Asymmetric Digital Subscriber Line) and so on.

In the Web server 1, an Internet interface module 11 is connected to the Internet network 5, and a LAN interface module 12 is connected to the PBX 2 via the LAN 7. The Internet interface module 11 and the LAN interface module 12 configure a communication interface unit 1A.

In the Web server 1, a Web server module 13 is defined as an information providing module for providing various categories of hypertext-formatted information containing content data on the Internet network 5 to the user terminal (PC) 4. The content data on the Internet network 5 are strictly defined as data of contents retained (stored) in servers accommodated in IP (Internet Protocol) networks such as the Internet, the Intranet etc and of contents existing on sites each containing information (object), to which URL (Uniform Resource Locator) hyperlinks.

Further, in the Web server 1, a browse history management module 14 manages a history (history information) of having accessed homepages on the Web sites or pages drawn from these homepages in such a way that those pieces of history information are stored mapping to IP addresses of the user terminals (PC) 4 in its history information management data storage module (database) 115. According to this embodiment, the homepage on the Web site or the page drawn from the homepage might be simply called a Web page or a page.

A history analyzing/outputting module 15 analyzes an interest of the user using the user terminal 4 on the basis of the history information stored in the history information management data storage module 115. The browse history management module 14, the history analyzing/outputting module 15 and the history information management data storage module 115 configure a browse history control unit 1B.

In the Web server 1, a notification phone number determining module 16 determines, based on a content inquired by the user, an inquiree phone number of an optimal in-charge person having the special knowledge about the inquiry at the call center, and displays this phone number on the user terminal (PC) 4. A display content setting module 17, when the in-charge person at the call center receives a call, sets a content that displayed on the in-charge person terminal (PC) 3. The notification phone number determining module 16 and the display content setting module 17 configure an inquiree phone number determining control unit 1D.

In the Web server 1, an in-charge determining module 18 determines an IP address of the in-charge person terminal (PC) corresponding to the callee phone number by referring to an in-charge person management data storage module (database) 119. A display content extraction module 19 refers to a phone number/display content management data storage module (database) 118, thereby extracting a display content on the in-charge person terminal (PC) 3 corresponding to the inquiree phone number. The in-charge person determining module 18 and the display content extraction module 19 configure an in-charger person determining control unit 1E. A display content output control module 110 requests the LAN interface module 12 to output to the in-charge person terminal (PC) 3.

In the Web server 1, an inquiree change processing module 111 changes the callee (inquiree) in accordance with a callee change request. A massage analyzing module 112 judges whether the request is a call receiving request or a callee change request corresponding to the inquiree phone number of which a change request device notifies. The inquiree change processing module 111 and the message analyzing module 112 configure an inquiree phone number change control unit 1F.

Further, in the Web server 1, an input information management module 113 manages search key information inputted on the Web browser (on the screen of the user terminal (PC) 4) in such a way that these pieces of search key information are stored mapping to the IP addresses of the users in an input information management data storage module (database) 116. An input information output module 114 analyzes the content of the user's inquiry on the basis of the search key information. The input information management module 113, the input information output module 114 and the input information management data storage module 116 configure an input information control unit 1C.

The above-mentioned respective components of the Web server 1 are connected to each other via internal buses 1G and 1H. the history information management data storage module 115, the input information management data storage module 116, a basic category key data storage module (database) 117, the phone number/display content management data storage module 118 and the in-charge person management data storage module 119 can be provided as databases on a hard disk device (not shown) of the Web server 1.

[Outline of Operation of Web-based CTI System]

Given next is an explanation of an outline of operation of the Web-based CTI system SYS in one embodiment of the present invention illustrated in FIG. 2. Note that the interposition of the internal buses 1G, 1H within the Web server 1 is omitted in the following discussion on the operation unless specified otherwise.

<Process During Browsing of Homepage (Processing Step 1 in FIG. 3)>

Figure 3:
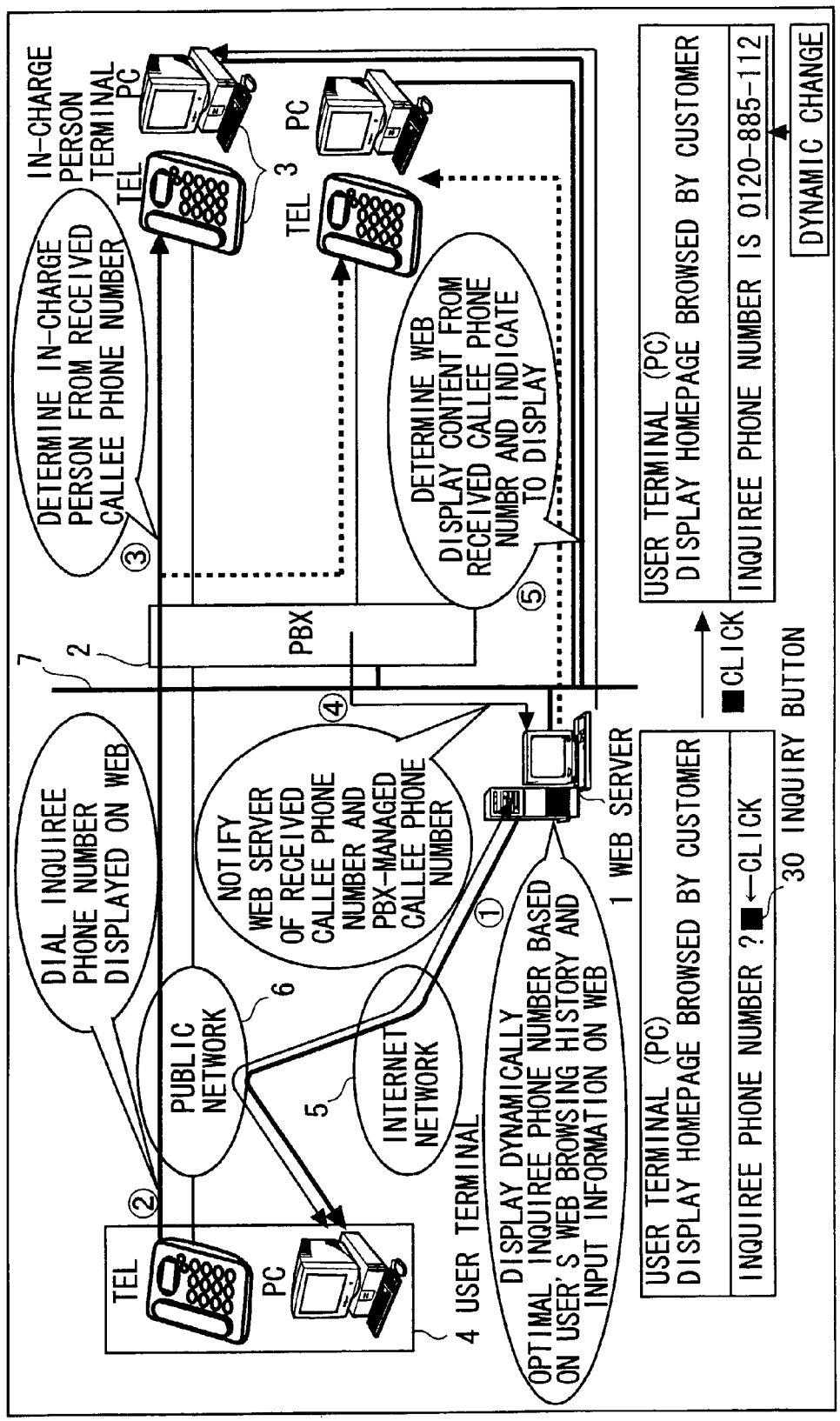
FIG. 3 is an explanatory view showing operations of the Web-based CTI system in one embodiment of the present invention.

Referring to FIGS. 2 and 3 in combination, in the Web-based CTI system SYS, each time the user accesses each homepage opened by a Web server module 13 via the internet interface module 11 in the Web server 1 from the Internet network 5 by utilizing the user terminal (PC) 4, the Web server module 13 boots the browse history management module 14.

The browse history management module 14 receives from the Web server module 13 an address (which might be referred to as a URL) of the homepage accessed by the user terminal (PC) 4 and an IP address unique to the user terminal (PC) 4, and searches the history information management data storage module (database) (URL management table) 115, wherein the homepage address is used as a key. The history information management data storage module (URL management table) 115 manages (is stored with) each of the related homepages as one single URL.

The browse history management module 14 stores the history information management data storage module (database) (IP management table) 115 with an IP address of the user terminal (PC) 4 and a user access count to a homepage specified by the hit URL as a result of searching the history information management data storage module (URL management table) 115.

In this case, if the user terminal (PC) is already accessing the related homepage, i.e., if the same IP address exists, the browse history management module 14 adds only the access count.

Further, the browse history management module 14 stores the IP address of the user terminal (PC) 4 and the received homepage address in the history information management data storage module (database) (final homepage address management table) 115 and, if the same IP address already exists, overwrites only the homepage address.

Moreover, if the user inputs a piece of search key information in the midst of browsing the homepage opened by the Web server module 13 via the Internet interface module 11 from the Internet network 5 by use of the user terminal (PC) 4, the Web server module 13 operates its own search engine and boots the input information management module 113.

The input information management module 113 receives from the Web server module 13 the IP address of the user terminal (PC) 4 that is being used by the user and character information corresponding to the inputted search key information, and stores these received pieces of information in the input information management data storage module 116.

<Process in Inquiry Request (Processing Step 1 in FIG. 3)>

Further, in the Web-based CTI system SYS, when the user makes an inquiry request by utilizing the user terminal (PC) 4, the Web server module 13 in the Web server 1 boots the notification phone number determining module 16. To be more specific, if the user browsed the homepage on the user terminal (PC) 4 but was unable to obtain a necessary item of information, the user presses (clicks by a mouse) an inquiry button 30 (see FIG. 3) displayed on the screen of the user terminal (PC) 4 through the Web browser. The Web server module 13, upon detecting the pressed state of this inquiry button 30, boots the notification phone number determining module 16.

The notification phone number determining module 16 receives from the Web server module 13 the IP address of the user terminal (PC) 4 utilized by the inquiry requesting user, and boots the history analyzing/outputting module 15.

The history analyzing/outputting module 15 searches, with the IP address of the user terminal (PC) 4 being used as a key, for IP management data in an access management field within the history information management data storage module (IP management table) 115, and extracts one or more URLs each exhibiting a comparatively large browsing count (access count) The history analyzing/outputting module 15 further searches the browse history management data storage module (URL management table) 115 on the basis of the extracted URLs, and extracts key information in which the user has an interest. The history analyzing/outputting module 15 further extracts a final homepage address mapping to the IP address from the history information management data storage module (final homepage address management table) 115, and notifies the notification phone number determining module 16 of these pieces of information.

The notification phone number determining module 16 searches the basic category key data storage module 117 with the key information being used as a key, and extracts an in-charge person group number matching with the inquiry at the call center.

The notification phone number determining module 16 further extracts, based on the extracted in-charge person group number, a free inquiree phone number (namely, a phone number with a display content that is not yet set) from the phone number/display content management data storage module 118, and notifies the Web server module 13 of this extracted phone number.

The Web server module 13 displays the notified inquiree phone number on the Web and thereafter boots the display content setting module 17. The display of this inquiree phone number dynamically changes each time an inquiry is made (whenever a call is received).

The display content setting module 17 receives from the notification phone number determining module 16 the IP address of the user terminal (PC) 4 used by the inquiry requesting user, the key information, the inquiree phone number and the final homepage address.

The display content setting module 17 searches the phone number/display content management data storage module 118 with the inquiree phone number being used as a key and sets, based on the key information, a converted piece of character information as a display content. Further, the display content setting module 17 sets the final homepage address as the display content in the phone number/display content management data storage module 118, and thereafter boots the input information output module 114.

The input information output module 114 receives from the display content setting module 17 the IP address of the user terminal (PC) 4 used by the inquiry requesting user, then extracts, based on this IP address, character information stored in the input information management data storage module 116, and notifies the display content setting module 17 of this piece of character information.

The display content setting module 17 sets the received character information as a display content in the phone number/display content management data storage module 118.

<Process in Dialing Inquiree Phone Number (Processing Steps 2 through 5 in FIG. 3)>

Further, in the Web-based CTI system SYS, when the user dials the inquiree phone number from on the user terminal (TEL) 4, the line control unit 21 in the PBX 2 at the call center detects a receipt of a voice communication connected to the inquiree phone number (the callee phone number received through the PBX) then determines an in-charge person corresponding to this inquiree phone number, and performs control for calling the in-charge person terminal (TEL) 3 utilized by this in-charge person.

The callee phone number notifying unit 22 in the PBX 2 transmits a phone number (a callee phone number=the PBX-managed phone number) and the received inquiree phone number (the received callee phone number) to the LAN interface module 12 in the Web server 1 via the LAN 7.

The LAN interface module 12 notifies the in-charge person determining module 18 of the phone number information received. The in-charge person determining module 18 searches the in-charge person management data storage module 119 with the notified callee phone number of the in-charge person terminal (TEL) 3 being used as a key, thus extracting an IP address of the in-charge person terminal (PC) 3. Thereafter, the in-charger person determining module 18 boots the display content extraction module 19.

The display content extraction module 19 receives the inquiree phone number from the in-charge person determining module 18, and searches the phone number/display content management data storage module 118 with this inquiree phone number being used as a key, thereby extracting, from the display content field, pieces of character information that are to be displayed. Then, the display content extraction module 19 notifies the in-charge person determining module of the thus extracted character information.

The in-charge person determining module 18 determines the IP address of the in-charge person terminal (PC) 3 and the content to be displayed on the in-charge person terminal (PC) 3, and boots the display content output control module 110. The display content output control module 110 indicates the in-charge person terminal (PC) 3 to display it via the LAN interface module 12.

With this scheme, simultaneously when the in-charge person terminal (TEL) 3 receives the call, the content of the inquiry from the user can be displayed on the in-charge person terminal (PC).

<Process in Changing Inquiree Phone Number (Processing Steps 1 through 5 in FIG. 4)>

Figure 4:
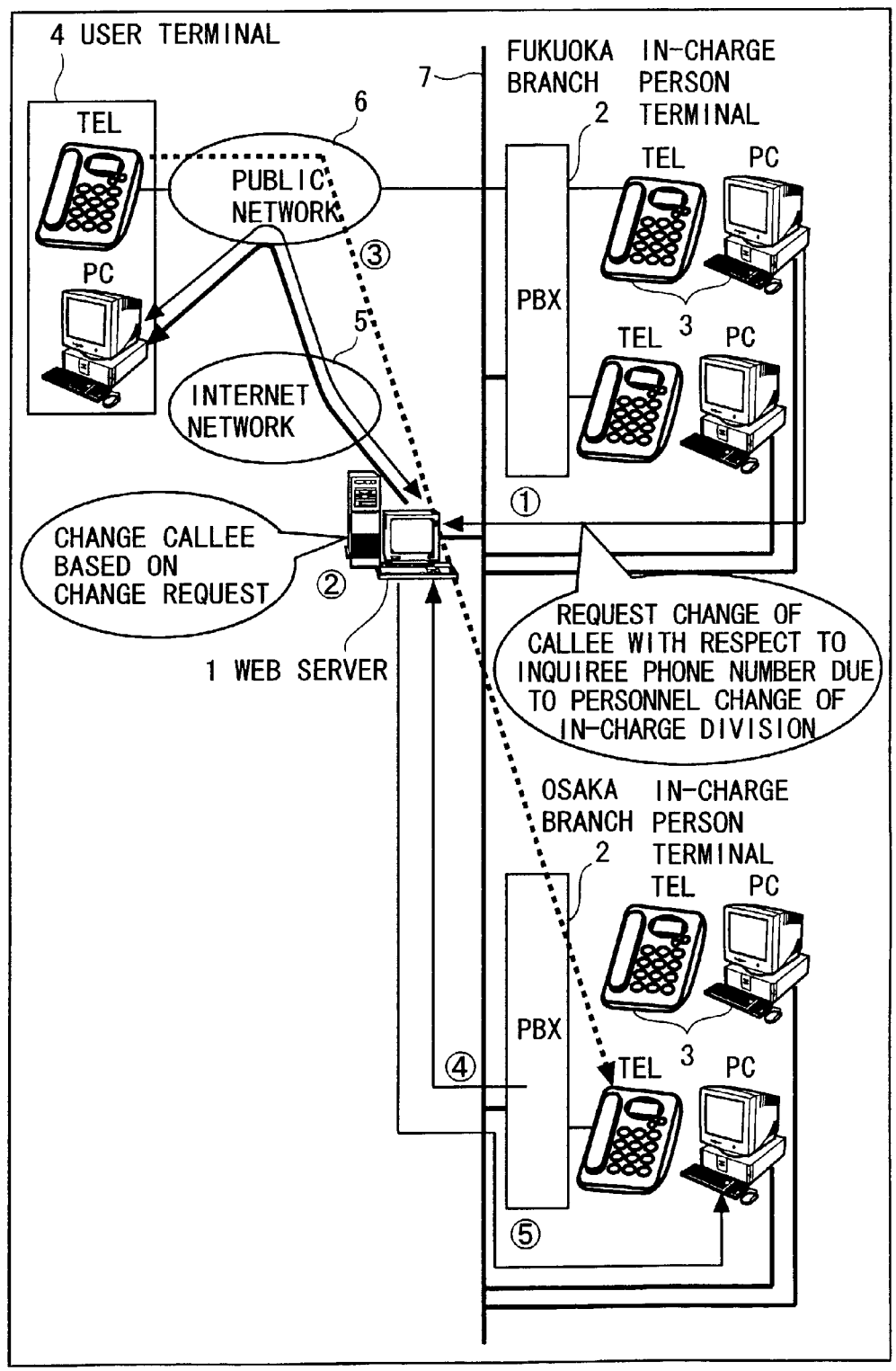
FIG. 4 is an explanatory view showing the operations of the Web-based CTI system in one embodiment of the present invention.

Referring next to FIGS. 2 and 4 in combination, in the Web-based CTI system SYS, the change request device (a maintenance console or the PBX 2), when there arises a necessity of changing the inquiree phone number due to a personnel change of the in-charge person or an in-charge division, edits a change request of the callee (inquiree) in accordance with an interface message format, and sends an interface message to the Web server 1 via the LAN 7.

The LAN interface module 12 in the Web server 1, when receiving this message, boots the message analyzing module 112. The message analyzing module 112 analyzes what the message indicates on the basis of the message received and, if the message indicates a call receiving request, boots the in-charge person determining module 18 to control a series of the same processes. Further, the message analyzing module 112, if the message indicates a callee change request, boots the inquiree change processing module 111.

The inquiree change processing module 111 extracts an in-charge person group, an inquiree phone number, a PBX-managed phone number (callee phone number) and an IP address (in-charge person IP address) of the in-charge person terminal (PC) 3 from the interface message received from the message analyzing module 112.

The inquiree change processing module 111 sets to overwrite the extracted inquiree phone number to an inquiree phone number field, corresponding to the extracted in-charge person group, within the phone number/display content management data storage module 118.

The inquiree change processing module 111 further sets to overwrite the extracted PBX-managed phone number and in-charge person IP address in an in-charge management data table, corresponding to the extracted in-charge person group, within the in-charge person management data storage module (database) 119.

The inquiry data of the interface message sent from the change request device are overwritten onto each item of management data corresponding to the inquiree phone number, whereby the callee can be changed.

In the Web server 1, when receiving the interface message indicating the call receiving request after executing the change process if the content of the interface message shows the callee change request, a series of the call receiving processes described above are executed based on the new items of overwritten data.

[Specific Example of Operation of Web-based CTI System]

Next, a specific example of the operation of the Web-based CTI system SYS in one embodiment of the present invention illustrated in FIG. 2, will be explained.

<Process During Browse of Homepage>

It is herein assumed that the user browses each of the homepages opened by the Web server module 13 via the Internet interface module 11 in the Web server 1 from the Internet network 5 by utilizing the user terminal (PC) 4. It is also assumed that the same user has an interest in a laptop personal computer (notebook size personal computer) manufactured by F Corp., which is also classified as a LAN-installed personal computer (broadband PC).

Referring to FIGS. 2, 3, 5, 6, 10 and 11 in combination, in the Web-based CTI system SYS, the user accesses a homepage related to the personal computer by utilizing the user terminal (PC) 4. With this event, the Web server module 13 in the Web server 1 boots the browse history management module 14 (processing step S101 in FIG. 10).

The browse history management module 14 receives from the Web server module 13 an address (URL) "http://172.27.111.010/Pcnote_ka/nnc" of the homepage accessed by the user and an IP address (user IP address): 192.168.111.100 of the on-connection user terminal (PC) 4. The browse history management module 14 searches the history information management data storage module (URL management table) 115 shown in FIG. 5, wherein the address "http://172.27.111.010/PCnote_ka/nnc" is used as a key (S102, S103).

The browse history management module 14 sets, based on the search result, the IP address "192.168.111.100" and the access count "1" in a record (line), specified by the hit URL, in the history information management data storage module (database) (IP management table) 115 (S103, S104, S105). In this case, if the related homepage is already accessed (i.e., if the same IP address exists), only the access count is added (S103, S104, S106).

The browse history management module 14 further stores the history information management data storage module (final homepage address management table) 115 with the IP address "192.168.111.100" and the received homepage address (final browse URL) "http://172.27.111.010/Pcnote_Ka/nnc" (S107, S108, S109). If the same IP address exists, only the homepage address is overwritten (S107, S108, S110).

This user has the interest in the notebook size personal computer (PC) and accessed mainly price data and specification data, and therefore the history information management data storage module (IP management table) 115 be, it is assumed, stored with an access history showing a price access count "10" and a specification access count "8".

Figure 11:
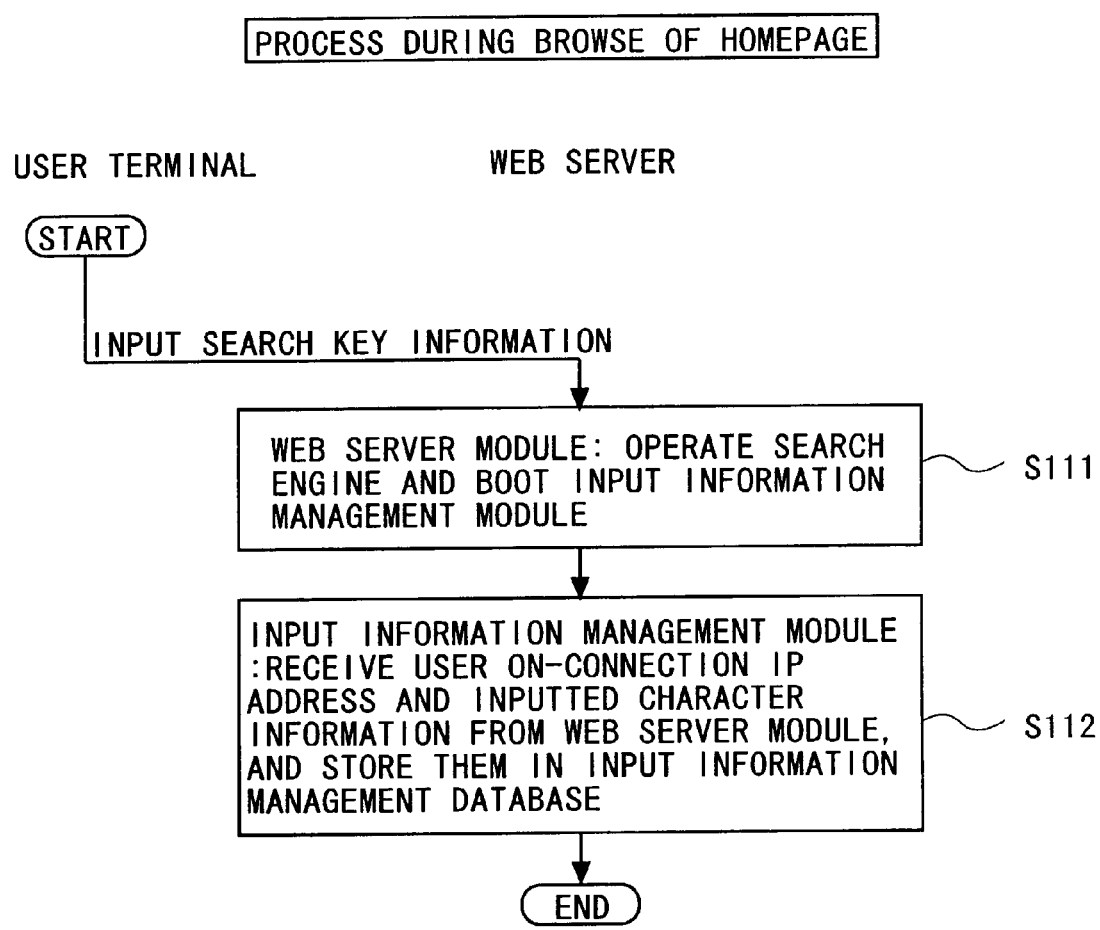
FIG. 11 is a flowchart showing a process during browsing the homepage.
Figure 12:
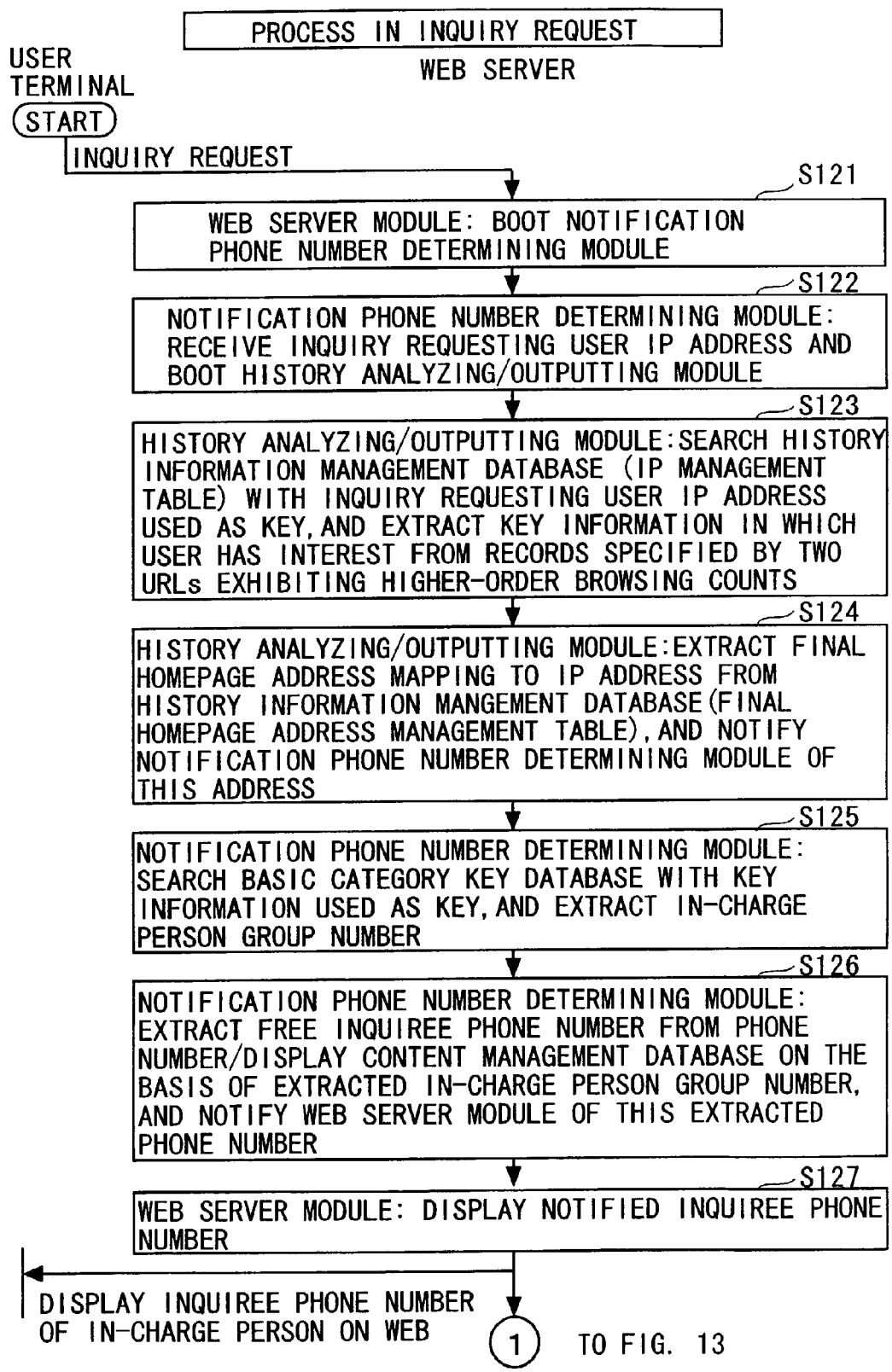
FIG. 12 is a flowchart showing a process in making an inquiry request.

The user has the interest in the LAN-installed personal computer manufactured by F Corp. and, when searching in the midst of browsing the homepage, the Web server module 13 operates the search engine and boots the input information management module 113 (processing step S111 in FIG. 11).

The input information management module 113 receives from the Web server module 13 the IP address "192.168.111.100" of the on-connection user terminal (PC) 4 and inputted pieces of character information "PC made by F Corp." and "LAN-installed PC" as search key information, and stores the received information in the input information management data storage module 116 (S112).

<Process in Inquiry Request>

Referring further to FIGS. 2, 3, 5, 7, 8, 12 and 13 in combination, in this Web-based CTI system SYS, if the user browsed the homepage on the user terminal (PC) 4 but was unable to obtain a necessary item of information, the user presses the inquiry button 30 (see FIG. 3) displayed on the screen of the user terminal (PC) 4 through the Web browser. The Web server module 13, upon detecting the pressed state of this inquiry button 30, boots the notification phone number determining module 16 (processing step S121 in FIG. 12).

The notification phone number determining module 16 receives from the Web server module 13 the IP address "192.168.111.100" of the user terminal (PC) 4 utilized by the inquiry requesting user, and boots the history analyzing/outputting module 15 (S122).

The history analyzing/outputting module 15 searches, with the IP address "192.168.111.100" received from the notification phone number determining module 16 and specifying the user terminal (PC) 4 being used as a key, for IP management data (entered in the access count field) within the history information management data storage module (IP management table) 115 (S123) The history analyzing/outputting module 15, based on the price access count "10" and the specification access count "8" that are two higher-order access counts among the browsing counts (access counts) obtained as a result of the search, extracts a price-related key record consisting of "1.PC-related" as a basic key, "2. notebook" as a primary key and "1. price" as a secondary key, and also a specification-related record consisting of "1. PC-related" as a basic key, "2. notebook" as a primary key and "2. specification" as a secondary key from a "key information" field in the history information management data storage module (URL management table) 115 (S123).

Further, the history analyzing/outputting module 15 extracts the final homepage address "http://172.27.111.010/Pcnote_ka/nnc" mapping to the IP address "192.168.111.100 from the history information management data storage module (database) (final homepage address management table) 115, and notifies the notification phone number determining module 16 of the extracted final homepage address together with those pieces of price- and specification-related key information (S124).

Figure 7:
FIG. 7 is a chart showing an example of a detailed structure of a basic category key data storage module (database) in FIG. 2.
Figure 10:
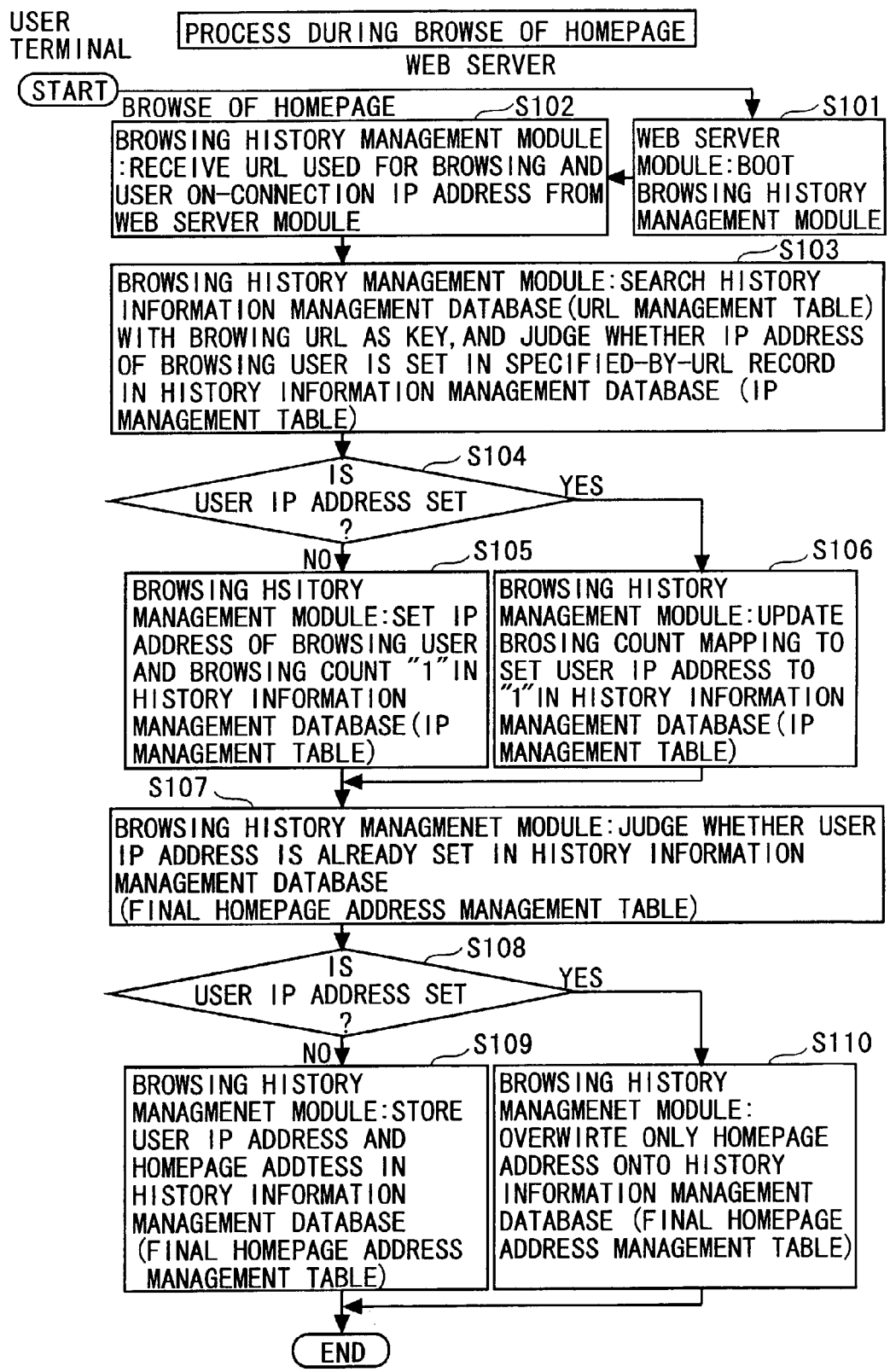
FIG. 10 is a flowchart showing a process during browsing a homepage.

The notification phone number determining module 16 extracts an in-charge person group number "4" suited to the inquiry at the call center by searching the basic category key data storage module 117 shown in FIG. 7, where in the price-related key information (the basic, primary and secondary keys: 1,2,1) and the specification-related key information (1,2,2) are used as keys (S125).

The notification phone number determining module 16 extracts, based on the extracted in-charge person group number "4", a free inquiree phone number (with no content displayed) "0120-885-112" from the phone number/display content management data storage module (database) 118, and notifies the Web server module 13 of this phone number (S126).

Figure 13:
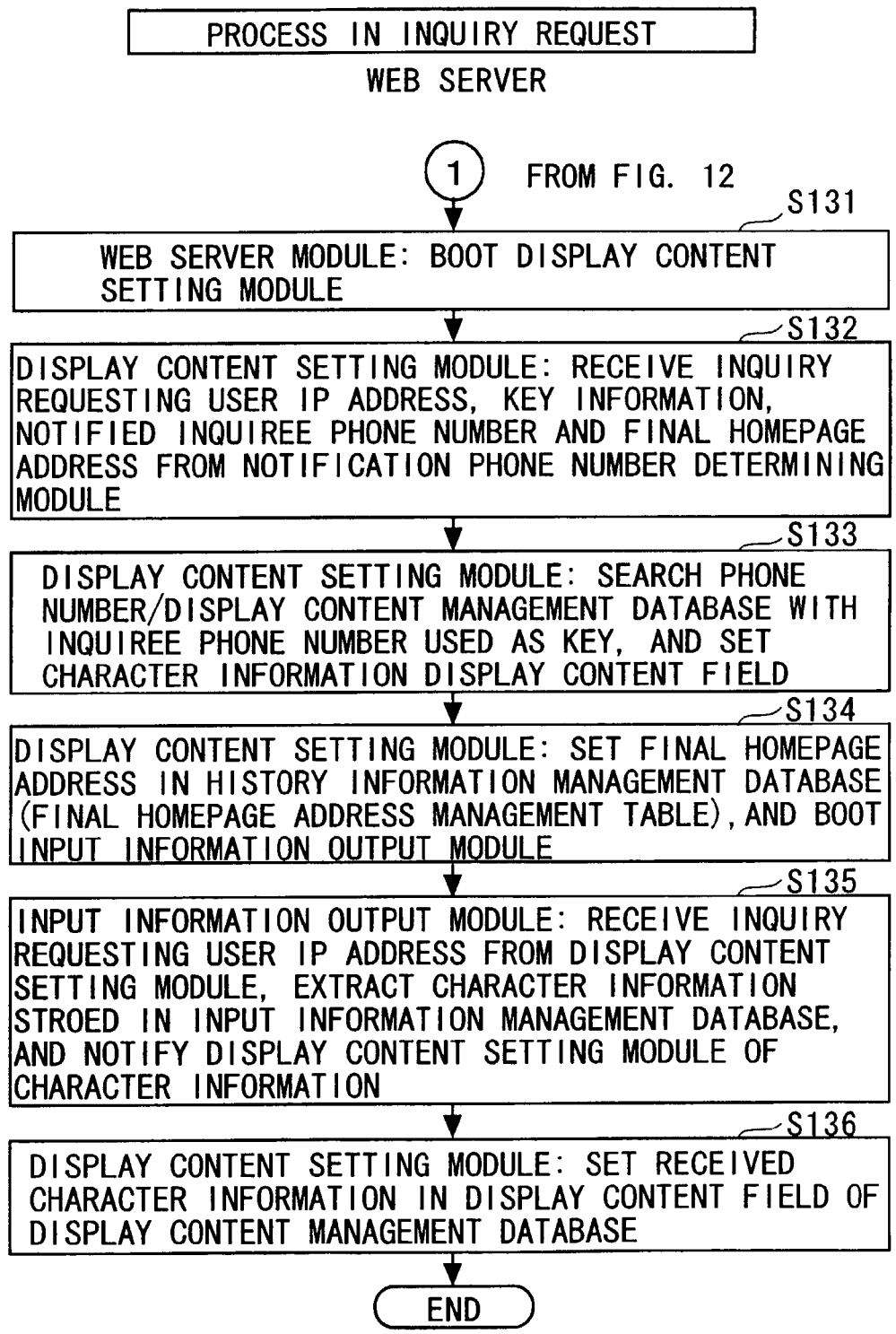
FIG. 13 is a flowchart showing a process in making the inquiry request.

The Web server module 13, after displaying the notified inquiree phone number "1020-885-112" on the Web, boots the display content setting module 17 (S127 and processing step S131 in FIG. 13). The inquiree phone number displayed on the Web is then displayed by the Wen browser on the screen of the user terminal (PC) 4 (see FIG. 3). The display of this inquiree phone number dynamically changed each time an inquiry is made (whenever a call is received).

The display content setting module 17 receives from the notification phone number determining module 16 the IP address "192.168.111.100" of the user terminal (PC) 4 used by the inquiry requesting user, the price-related key information (the basic, primary and secondary keys: 1, 2, 1), the specification-related key information (the basic, primary and secondary keys: 1, 2, 2), the inquiree phone number "0120-885-112" and the final homepage address "http://172.27.111.010/PCnote_ka/nnc" (S132).

The display content setting module 17 searches the phone number display content management data storage module (database) 118 with the inquiree phone number "0120-885-112" being used as a key, thereby setting, in the display content field, a piece of character information "the user has the interest in the prices and specifications of the notebook size personal computers" converted based on the price-related key information (1, 2, 1) and the specification-related key information (1, 2, 2), and also setting the final homepage address "http://172.27.111.010/Pcnote_ka/nnc" in the display content field (S133, S134). Thereafter, the display content setting module 17 boots the input information output module 114 (S134).

The input information output module 114 receives the IP address "192.168.111.100 of the user terminal (PC) 4 utilized by the inquiry requesting user from the display content setting module 17, then extracts pieces of character information "PC made by F Corp." and "LAN-installed PC" stored in the input information management data storage module 116, and notifies the display content setting module 17 of these pieces of character information (S135).

The display content setting module 17 sets the received character information "PC made by F Corp." and "LAN-installed PC" in the display content field in the phone number/display content management data storage module (database) 118 (S136).

<Process in Receiving Call to Inquiree Phone Number>

Figure 14:
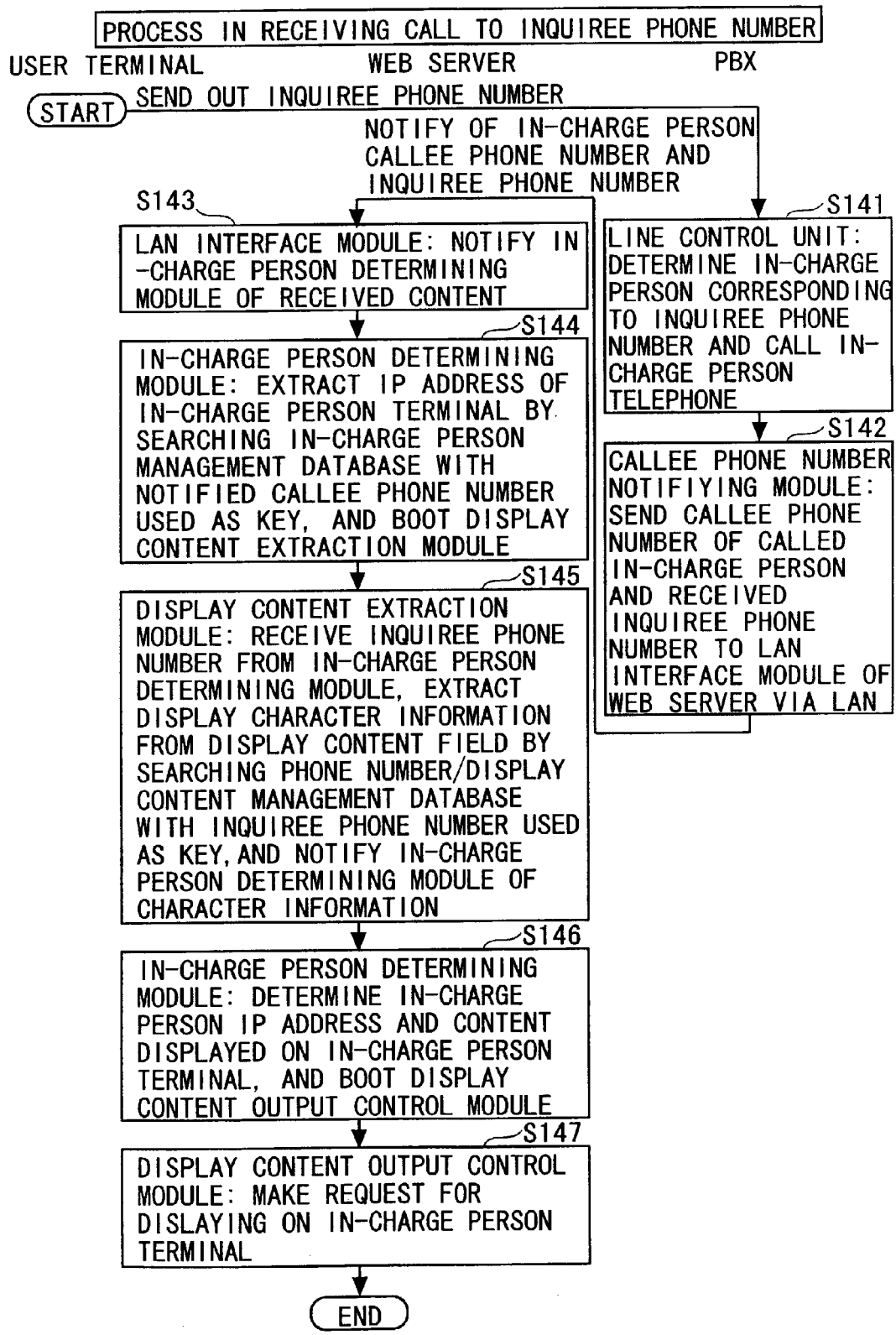
FIG. 14 is a flowchart showing a process in receiving a call of an inquiree phone number.

Referring further to FIGS. 2, 32, 8, 9, 14 and 15 in combination, in the Web-based CTI system SYS, hen the user dials the inquiree phone number "0120-885-112" from on the user terminal (TEL) 4, the line control unit 21 in the PBX 2 at the call center detects the receipt of the voice communication connected to "0120-885-112", then determines an in-charge person corresponding to this inquiree phone number, and performs control for calling the telephone specified by the PBX-managed phone number (callee phone number) "4201" as the in-charge person terminal (TEL) 3 used by this in-charge person (processing step S141 in FIG. 14). Note that if this telephone is unable to answer due to an on-speech process, the line control unit 21 executes control for call other telephone (e.g., a PBX-managed phone number "4709") among those belonging to the same in-charge person group numbered "4" according to a selection algorithm preset by the PBX 2.

The callee number notification module 22 in the PBX 2 sends the callee phone number "4201" of the called in-charged person terminal (TEL) 3 and the inquiree phone number (callee phone number received) "0120-885-112" to the LAN interface module 12 of the Web server 1 via the LAN 7 (S142).

The LAN interface module 12 notifies the in-charge person determining module 18 of the phone number information received (S143). The in-charge person determining module 18 extracts the IP address "180.111.222.100" of the in-charge person terminal (PC) 3 by searching the in-charge person management data storage module (database) 119 shown in FIG. 9, wherein the notified callee phone number "4201" of the in-charge person terminal (TEL) 3 is used as a key (S144). Thereafter, the in-charge person determining module 18 boots the display content extraction module 19 (S144).

The display content extraction module 19 receives the inquiree phone number "0120-885-112" from the in-charge person determining module 18, and extracts, from the display content field, pieces of display character information such as [the user has the interest in the prices and specifications of the notebook size PCs], [the final homepage address "http://172.27.111.010/PCnote_ka/nnc"], and [the search keys are "PC made by F Corp." and "LAN-installed PC"] by searching the phone number/display content management data storage module (database) 118 shown in FIG. 8 with the above inquiree phone number being used as a key, and notifies the in-charge person determining module 18 of these pieces of information (S145).

The in-charge person determining module 18 determines the IP address "180.111.222.100" of the in-charge person terminal (PC) 3 and the display contents of [the user has the interest in the prices and specifications of the notebook size PCs], [the final homepage address "http://172.27.111.010/Pcnote_ka/nnc"], and [the search keys are "PC made by F Corp." and "LAN-installed PC"] which are displayed on the in-charge person terminal (PC) 3, and boots the display content output control module 110 (S146).

The display content output control module 110 requests the in-charge person terminal (PC) 3 via the LAN interface module 12 to display the character information described above (S147). FIG. 15 shows a display example of the character information displayed on the in-charge person terminal (PC) 3.

<Process in Changing Inquiree Phone Number>

Referring next to FIGS. 2, 4, 8, 9 and 16 through 18 in combination, in the Web-based CTI system SYS, the change request device (that is herein the in-charge person terminal (PC) 3 functioning as the maintenance console at the call center), if there arises a necessity of changing the inquiree phone number doe to the personnel change of the in-charge person or in-charge division, edits the change request of the callee (inquiree) in accordance with the interface message format shown in FIG. 16, and sends an interface message via the LAN 7 to the Web server 1.

Figure 17:
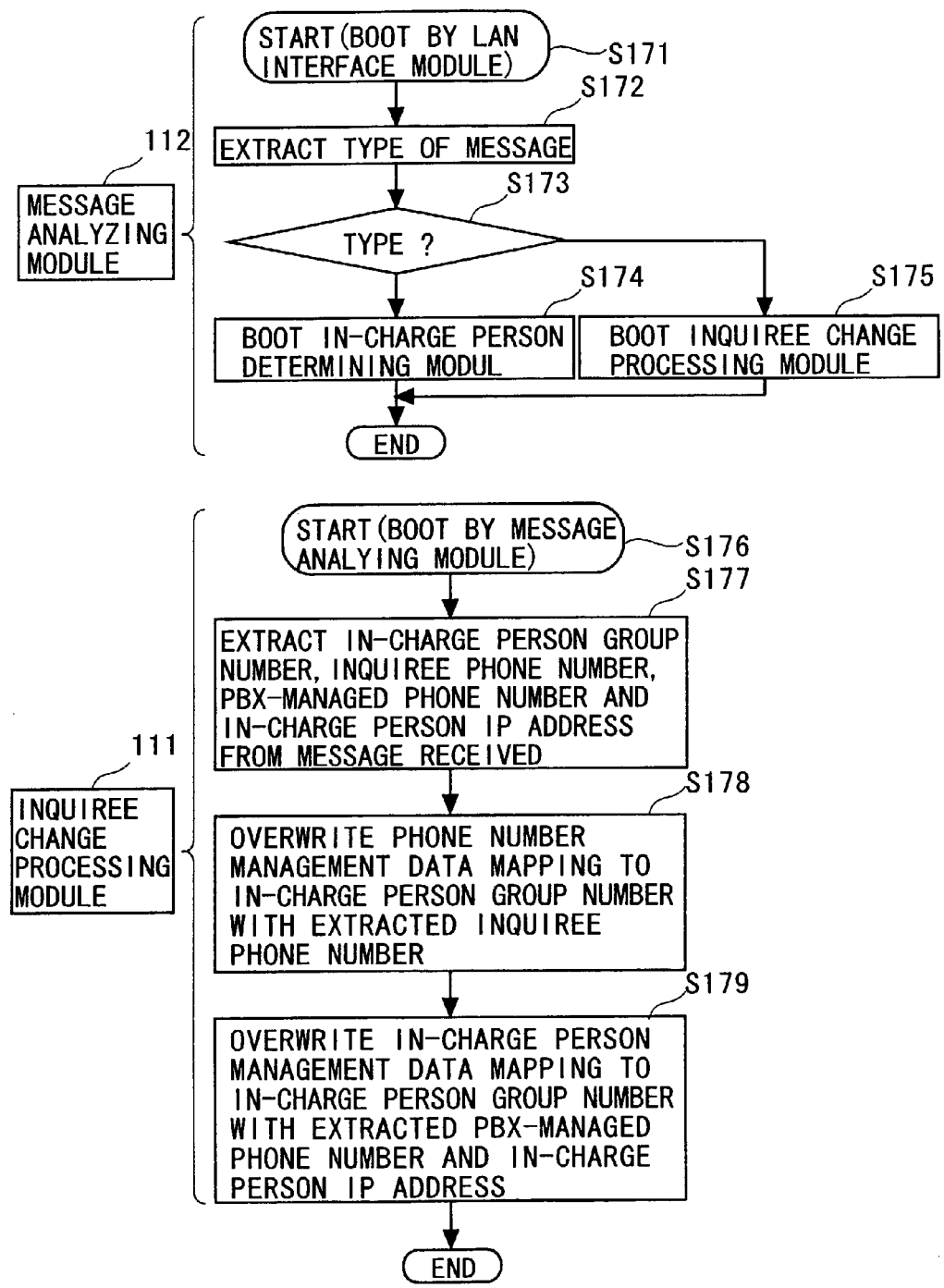
FIG. 17 is a flowchart showing a process in changing the inquiree phone number.

The LAN interface module 12 of the Web server 1, upon receiving this interface message, boots the message analyzing module 112 (processing step S171 in FIG. 17).

The message analyzing module 112 analyzes what the message indicates on the basis of the interface message received and, if the message indicates a call receiving request RNG, boots the in-charge person determining module 18 to control a series of the call receiving processes described above (S172, S173, S174). Further, the message analyzing module 112, if the message indicates a callee change request CHG, boots the inquiree change processing module 111 (S172, S173, S175).

The inquiree change processing module 111 extracts a group number "4" entered in an in-charge person group field, phone numbers "0120-885-222 through 0120-885-999" entered in an inquiree phone number field, telephone numbers (callee phone numbers) "5001 through 50090" entered in a PBX-managed phone number field and in-charge person terminal (PC) 3 IP addresses "180.111.222.150 through 180.111.222.168" entered in an IP address (in-charge person IP address) field from the interface message received from the message analyzing module 112 (S176, S177).

The inquiree change processing module 111 sets to overwrite the extracted inquiree phone number to an inquiree phone number field (in the phone number management data table) in the phone number/display content management data storage module (database) 118 (see FIG. 8), corresponding to the extracted in-charge person group numbered "4" (S178).

The inquiree change processing module 111 further sets to overwrite the extracted PBX-managed phone number and in-charge person IP address onto the in-charge management data, corresponding to the extracted in-charge person group numbered "4", within the in-charge person management data storage module (database) 119 (see FIG. 9) (S179). FIG. 18 shows an example of how the data in the phone number/display content management data storage module 118 and in the in-charge person management data storage module 119, are changed by the data overwrite setting described above.

In the Web server 1, when receiving the interface message indicating the call receiving request RNG after executing the change process if the content of the interface message shows the callee change request CHG, a series of the call receiving processes described above are executed based on the new items of overwritten data.

As discussed above, according to the present invention, it is possible to obtains the Web-based architecture that more easily constructs the call center or the help desk for performing the customer window services such as selling the commercial articles and consulting with the customers.

According to the present invention, when the customer makes the inquiry from on the customer terminal, the customer can be notified of the phone number of the in-charge person terminal used by the in-charge person capable of providing the information needed by the customer.

According to the present invention, even when the customer re-inquires from on the customer terminal, the customer may simply dial the same phone number without the reconnection to the IP network such as the Internet network.

Further, according to the present invention, the in-charge person at the call center is recognizable of the inquiry content of customer just when the in-charge person terminal receives the voice communication and capable of giving the quick and exact service. This leads to an improved degree of satisfaction of the customer.

Moreover, according to the present invention, even when the inquiree phone number changes due to the external factor, the call can be received by the optimal in-charge person.

Hence, according to the present invention, even when the inquiry request occurs again, the customer can speak directly to the optimal in-charge person with neither a restriction in terms of the communication environment nor a restriction in time, whereby the speech time can be reduced.

Moreover, it is feasible to obviate a problem that a customer's own phone number inputted from on the customer terminal and transmitted to the Web server might leak out or be abused.

Still further, there is eliminated a necessity for a CTI server making the management about whether the telephone of the in-charge terminal at the call center etc is free or occupied and controlling the telephones, and therefore a cost for configuring the call center decreases.

MODIFIED EXAMPLE

The processes described above are provided as an executable-by-computer program, and this program can be recorded on a recording medium such as a CD-ROM, a floppy disk etc and be distributed via a communication line. Further, an arbitrary number or all of the processes described above can be selectively combined and thus executed.

In the embodiment discussed above, two categories of phone numbers such as the inquiree phone number and the callee phone number are dealt with, however, only the inquiree phone number may also be used.

Although only a few embodiments of the present invention have been described in detail above, those skilled in the art will readily appreciate that many modifications are possible in the preferred embodiments without departing from the novel teachings and advantages of this invention. Accordingly, all such modifications are intended to be included within the scope of the present invention as defined by the following claims.

What is claimed is:

1. A Web-based CTI system comprising:
   a first control module displaying, on a screen of a customer terminal, an inquiree phone number for specifying an in-charge person terminal utilized by an in-charge person capable of providing information needed by a customer, the inquiree phone number determined based on a browsing history and input information given so far in response to an inquiry request occurring in the midst of browsing a page on the screen of said customer terminal utilized by the customer; and
   a second control module displaying, when there occurs a receipt of a voice communication connected to the inquiree phone number that is displayed on the screen of said customer terminal, on the screen of said in-charge person terminal apiece of information as an inquiry content containing an interest of the customer utilizing the customer terminal that has been generated based on the browsing history and the input information, the screen display being triggered by the receipt of the voice communication,
   wherein said first control module dynamically changes the display of the inquiree phone number on the screen of said customer terminal.

2. A Web-based CTI system according to claim 1, further comprising:
   a module detecting the receipt of the voice communication connected to the inquiree phone number for specifying the in-charge person terminal that is displayed on the screen of said customer terminal; and
   a module notifying a Web computer of the inquiree phone number for specifying the in-charge person terminal when detecting the receipt of the voice communication.

3. A Web-based CTI system according to claim 2, further comprising a module determining, based on address information obtained corresponding to the notified inquiree phone number, a display target in-charge person terminal on which the information containing the interest of the customer is displayed as the inquiry content.

4. A Web-based CTI system according to claim 1, further comprising a module extracting, based on the inquiree phone number, the information as the inquiry content containing the interest of the customer that is stored for being displayed on said in-charge person terminal.

5. A Web-based CTI system according to claim 1, further comprising a module receiving a change request of said in-charge person terminal and rewriting, based on a new inquiree phone number and a new piece of address information contained in the change request, corresponding pieces of stored data.

6. A Web-based CTI system according to claim 1, wherein the inquiry request occurs upon specifying an inquiry button displayed on the screen of said customer terminal in the midst of browsing the page.

7. An information providing control device in a Web-based CTI system, comprising:
　a first control module displaying, on a screen of a customer terminal, an inquiree phone number for specifying an in-charge person terminal utilized by an in-charge person capable of providing information needed by a customer, the inquiree phone number determined based on a browsing history and input information given so far in response to an inquiry request occurring in the midst of browsing a page on the screen of said customer terminal utilized by the customer; and
　a second control module displaying, when there occurs a receipt of a voice communication connected to the inquiree phone number that is displayed on the screen of said customer terminal, on the screen of said in-charge person terminal a piece of information as an inquiry content containing an interest of the customer utilizing the customer terminal that has been generated based on the browsing history and the input information, the screen display being triggered by the receipt of the voice communication,
　wherein said first control module dynamically changes the display of the inquiree phone number on the screen of said customer terminal.

8. An information providing control device in a Web-based CTI system according to claim 7, further comprising a module determining a display target in-charge person terminal on which the information containing the interest of the customer is displayed as the inquiry content on the basis of address information obtained corresponding to the inquiree phone number which an exchange device detecting a receipt of the voice communication notifies.

9. An information providing control device in a Web-based CTI system according to claim 7, further comprising a module extracting, based on the inquiree phone number, the information as the inquiry content containing the interest of the customer that is stored for being displayed on said in-charge person terminal.

10. An information providing control device in a Web-based CTI system according to claim 7, further comprising a module receiving a change request of said in-charge person terminal and rewriting, based on a new inquiree phone number and a new piece of address information contained in the change request, corresponding pieces of stored data.

11. An information providing control method in a Web-based CTI system, comprising:
　displaying, on a screen of a customer terminal, an inquiree phone number for specifying an in-charge person terminal utilized by an in-charge person capable of providing information needed by a customer, the inquiree phone number determined based on a browsing history and input information given so far in response to an inquiry request occurring in the midst of browsing a page on the screen of said customer terminal utilized by the customer;
　displaying, when there occurs a receipt of a voice communication connected to the inquiree phone number that is displayed on the screen of said customer terminal, on the screen of said in-charge person terminal a piece of information as an inquiry content containing an interest of the customer utilizing the customer terminal that has been generated based on the browsing history and the input information, the screen display being triggered by the receipt of the voice communication; and
　dynamically changing the display of the inquiree phone number on the screen of said customer terminal.

12. An information providing control method in a Web-based CTI system according to claim 11, further comprising determining, based on address information obtained corresponding to the notified inquiree phone number, a display target in-charge person terminal on which the information containing the interest of the customer is displayed as the inquiry content.

13. An information providing control method in a Web-based CTI system according to claim 11, further comprising extracting, based on the inquiree phone number, the information as the inquiry content containing the interest of the customer that is stored for being displayed on said in-charge person terminal.

14. An information providing control method in a Web-based CTI system according to claim 11, further comprising receiving a change request of said in-charge person terminal and rewriting, based on a new inquiree phone number and a new piece of address information contained in the change request, corresponding pieces of stored data.

15. A readable-by-computer recording medium recorded with a program, executed by a computer, comprising:
　displaying, on a screen of a customer terminal, an inquiree phone number for specifying an in-charge person terminal utilized by an in-charge person capable of providing information needed by a customer, the inquiree phone number determined based on a browsing history and input information given so far in response to an inquiry request occurring in the midst of browsing a page on the screen of said customer terminal utilized by the customer;
　displaying, when there occurs a receipt of a voice communication connected to the inquiree phone number that is displayed on the screen of said customer terminal, on the screen of said in-charge person terminal a piece of information as an inquiry content containing an interest of the customer utilizing the customer terminal that has been generated based on the browsing history and the input information, the screen display being triggered by the receipt of the voice communication; and
　dynamically changing the display of the inquiree phone number on the screen of said customer terminal.

* * * * *

UNITED STATES PATENT AND TRADEMARK OFFICE
CERTIFICATE OF CORRECTION

PATENT NO. : 7,149,302 B2  Page 1 of 1
APPLICATION NO. : 10/268183
DATED : December 12, 2006
INVENTOR(S) : Atsushi Tsukazoe et al.

It is certified that error appears in the above-identified patent and that said Letters Patent is hereby corrected as shown below:

Claim 1 column 16, line 48: "- apiece -" should be changed to -- -- a piece -- --.

Signed and Sealed this

Fourteenth Day of August, 2007

JON W. DUDAS
*Director of the United States Patent and Trademark Office*